(12) United States Patent
Imai

(10) Patent No.: US 8,011,674 B2
(45) Date of Patent: Sep. 6, 2011

(54) METAL LAMINATE GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 527 days.

(21) Appl. No.: 12/285,486

(22) Filed: Oct. 7, 2008

(65) Prior Publication Data

US 2009/0096176 A1  Apr. 16, 2009

(30) Foreign Application Priority Data

Oct. 12, 2007  (JP) .................................. 2007-266721

(51) Int. Cl.
*F16J 15/32* (2006.01)
(52) U.S. Cl. ...................................................... 277/593
(58) Field of Classification Search ........... 277/590–595
See application file for complete search history.

(56) References Cited

U.S. PATENT DOCUMENTS

| | | | |
|---|---|---|---|
| 5,690,343 A * | 11/1997 | Takada et al. ................. | 277/595 |
| 7,374,177 B2 * | 5/2008 | Tripathy et al. ............... | 277/593 |
| 2006/0017232 A1 * | 1/2006 | Udagawa ....................... | 277/592 |
| 2006/0091615 A1 * | 5/2006 | Udagawa ....................... | 277/594 |
| 2006/0119050 A1 * | 6/2006 | Tripathy et al. ............... | 277/592 |

* cited by examiner

*Primary Examiner* — Thomas Beach
*Assistant Examiner* — Gilbert Lee
(74) *Attorney, Agent, or Firm* — Manabu Kanesaka

(57) ABSTRACT

A metal laminate gasket to be arranged between two members includes a first metal plate and a second metal plate laminated together. The first metal plate has a first hole to be sealed, a first bead around the first hole, and a plurality of second holes around the first bead as bolt holes. The second metal plate has a third hole and fourth holes corresponding to the first and second holes, respectively, and depressions formed at a side facing the first metal plate around the third hole. Each of the depressions is formed on two sides of a line connecting a center of the third hole and a center of each of the fourth holes so that a compressing force of the bead when the gasket is compressed becomes substantially equal around the first hole.

9 Claims, 3 Drawing Sheets

METAL LAMINATE GASKET

BACKGROUND OF THE INVENTION AND RELATED ART STATEMENT

The invention relates to a metal laminate gasket that is mounted between two members coupled to each other, which have holes to be mutually communicated, for sealing the periphery of the holes. The invention relates, in particular, to a metal laminate gasket that is suitably used at the terminal or connecting areas of various supply and exhaust pipes.

It is very commonly known to form a structure in connecting, via a metal laminate gasket having a bead for sealing, two members having holes to be mutually communicated, such as connecting areas of various supply and exhaust pipes. In this connecting structure, flanges, or equivalents thereto, are provided at the connecting areas of the two members, and the flanges are mutually fastened and fixed by bolts at several points around the holes.

The same applies to the connection of a cylinder block and a head block in an internal combustion engine, through a cylinder head gasket.

In a case where, at the connecting areas of such two members, the above-mentioned flanges are fastened and fixed by the above-mentioned bolts at several points around the hole to be mutually communicated, the compressing force working on the bead between the flanges becomes very great at places near the bolts. On the other hand, at places away from the bolts, the compressing forces become weak because their fastening forces have less effect there. As a result, there arises a problem that stable sealing cannot be provided because the bead surface pressure in the gasket around the hole to be mutually communicated becomes unequal. This sort of problem becomes more apparent as the mechanical strength of flanges or equivalents thereto becomes weaker because of saving of material for economy and making the members to be coupled to each other with light weight.

The technical feature covered by this invention is that in connecting two members having holes to be mutually communicated via a metal laminate gasket having a bead at its hole edge by mutually fastening and fixing the two members by means of bolts at several points on the flanges in their connecting areas, the compressing force of the above-mentioned bead generated by the fastening forces of the above-mentioned bolts is made substantially equal in the circumference of the hole edge.

Further objects and advantages of the invention will be apparent from the following description of the invention.

SUMMARY OF THE INVENTION

In order to solve the above-mentioned problem, a metal laminate gasket is mounted between two members coupled to each other which have holes to be mutually communicated for sealing of the peripheries of the holes, wherein the gasket is formed by laminating multiple metal plates, and has a communicating hole corresponding to the holes to be mutually communicated of the above-mentioned two members, and around the communicating hole, several bolt holes to insert bolts to fasten the above-mentioned two members.

In the gasket, one of the metal plates is formed as a bead plate, to have a bead on the edge of the communicating hole, and on the same edge in another metal plate, on both sides of a line connecting the center of the communicating hole and the center of each of the bolt holes, a depression is formed by coining to make the compressing force of the bead generated by the fastening force of the bolts even.

In a preferred embodiment of the above-mentioned metal laminate gasket of the present invention, each of the above-mentioned depressions is formed in such a way to have an area with a constant depth within a range of 15 to 20 degrees on each side of the line connecting the center of the above-mentioned communicating hole and the center of the bolt hole and to have, on both sides of the constant depth area, gentle faces leading to the metal plate surface. Moreover, the above-mentioned depressions formed by coining can be regulated so that the compressing force of the above-mentioned beads may be equalized by its measurement. Furthermore, in the above-mentioned metal laminate gasket, two to six bolt holes according to the number of bolts needed to couple the above-mentioned two members can be arranged equally around the above-mentioned communicating hole.

It should be noted that the metal laminate gaskets of the present invention can be applied not only in the connection, via a gasket, of two members, such as connecting areas of various supply and exhaust pipes, that have holes to be mutually communicated, but also in the case of a cylinder head gasket interposed between a cylinder block and a head block in an internal combustion engine.

In cases where two members having holes to be mutually communicated are connected, via a metal laminate gasket having a bead on its communicating hole edge, by means of mutually fastening and fixing with bolts at several points in the flanges of the connecting areas of the two members, the metal laminate gasket of the present invention makes it possible to even the compressing force of the bead generated by the fastening force of the bolts in the circumference of the communicating hole edge.

DETAILED DESCRIPTION OF PREFERRED EMBODIMENTS

Figure 1:
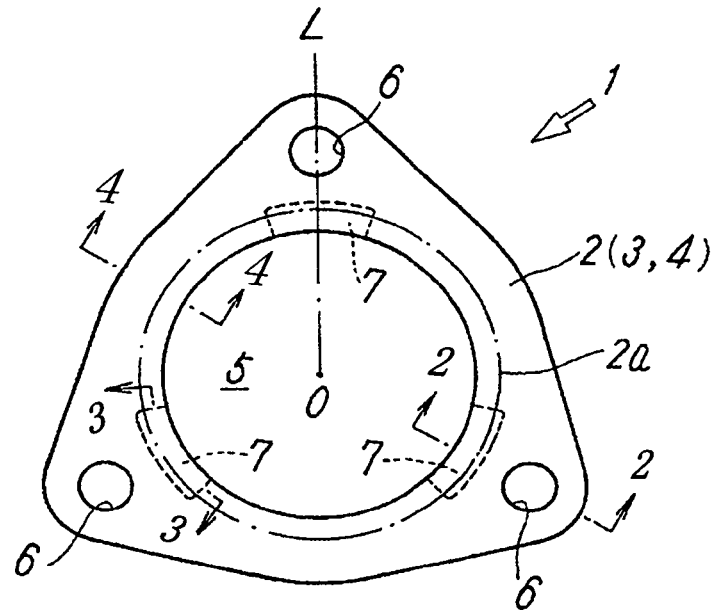
FIG. 1 is a plan view showing a first embodiment of a metal laminate gasket of the present invention.

FIGS. 1 to 4 illustrate a first embodiment of the metal laminate gasket of the present invention. Metal laminate gasket 1 is mounted between two members coupled to each other which have holes to be mutually communicated, such as the connecting areas of various supply and exhaust pipes, for the sealing of the peripheries of the holes at the connecting areas. It can also be applied, for example, to a cylinder head gasket interposed between a cylinder block and a head block in an internal combustion engine.

The above-mentioned metal laminate gasket 1 is formed by laminating multiple metal plates. In the first embodiment illustrated in the figure, the gasket has two outer plates 2 and 3, formed by metal plates, and intermediate plate 4 which is interposed between outer plates 2 and 3. Outer plates 2 and 3 and intermediate plate 4 have holes 2b, 3b and 4a to be mutually communicated. Gasket 1 has communicating hole 5, formed by holes 2b, 3b and 4a, which communicates holes 8a and 9a of two members 8 and 9 coupled to each other via the gasket 1. It also has bolt holes 6 around communicating hole 5 to insert bolts (illustration omitted) to couple the above-mentioned two members 8 and 9.

The figure here illustrates a case in which three bolt holes 6 are equally arranged around communicating hole 5, but in other cases, two to six bolt holes according to the number of bolts needed to couple two members 8 and 9 can be equally arranged around communicating hole 5.

Figure 2:
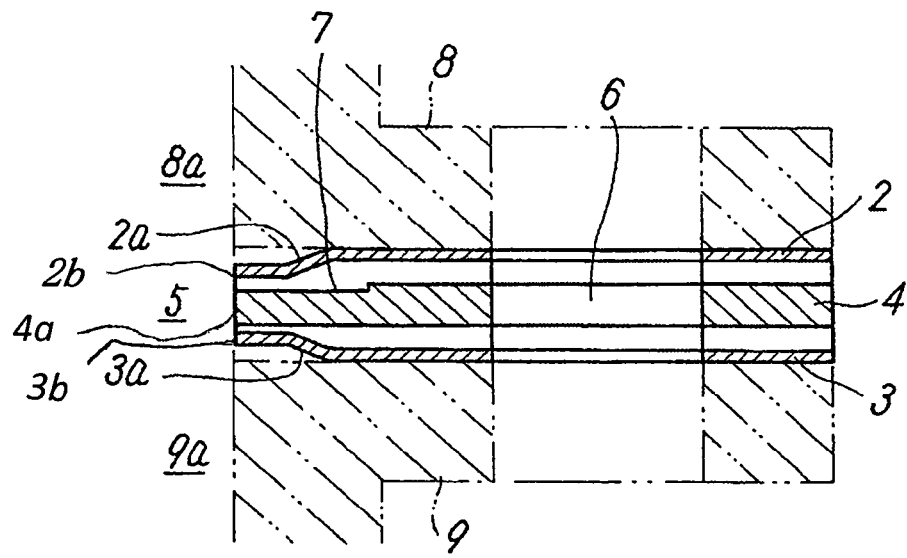
FIG. 2 is an enlarged cross sectional view taken along line 2-2 in FIG. 1.
Figure 3:
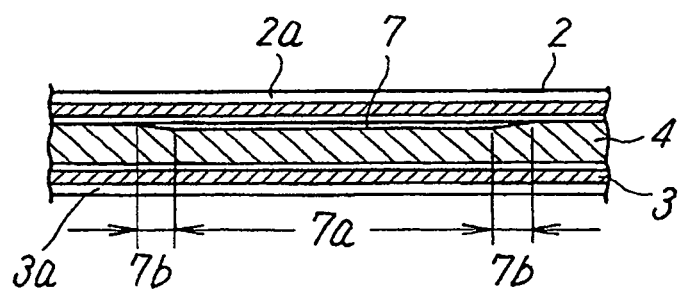
FIG. 3 is an enlarged cross sectional view taken along line 3-3 in FIG. 1.
Figure 4:
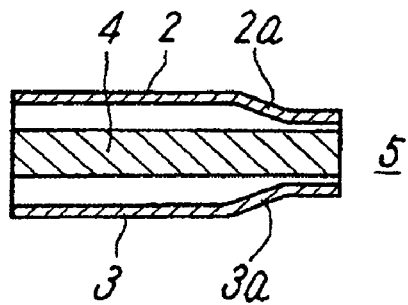
FIG. 4 is an enlarged cross sectional view taken along line 4-4 in FIG. 1.

In the above-mentioned metal laminate gasket 1, outer plates 2 and 3 among the above-mentioned laminated metal plates, serving as bead plates, form beads (half beads) 2a and 3a on the edge of communicating hole 5. Depressions 7 shown in FIGS. 1 to 3 are formed by coining on the edge of communicating hole 5 of intermediate plate 4, which is the other laminated metal plate.

Depressions 7 are provided on both sides of line L connecting the center of the above-mentioned communicating hole 5 and the center of each of bolt holes 6 for the purpose of equalizing the compressing force of beads 2a and 3a generated by the fastening force of the above-mentioned bolts. Depressions 7 and the above-mentioned beads 2a and 3a are formed so that they are mutually superimposed.

In cases of connecting the connecting areas of these two members 8 and 9 by mutually fastening and fixing them with bolts at several points around holes 8a and 9a to be mutually communicated, and in particular when the mechanical strength at the flanges of two members 8 and 9 is insufficient, the compressing force working on beads 2a and 3a between two members 8 and 9 is very great at places near the bolt and is weak at places away from the bolt due to less effect of its fastening force. However, if the above-mentioned depressions 7 are provided near the bolt holes, the compressing force of the above-mentioned beads 2a and 3a generated by the fastening force of the bolts is equalized around communicating hole 5, so that stable sealing in the circumference of the communicating hole 5 can be provided.

The range, in the circumference of the above-mentioned communicating hole 5, where depressions 7 should be provided differs depending on the mechanical strength of the connecting areas of two members 8 and 9 to be connected via gasket 1. Generally speaking, it is preferable that area 7a with a constant depth should be formed in a range of 15 to 20 degrees on both sides of line L connecting the center of the above-mentioned communicating hole 5 and the center of each of bolt holes 6, and areas 7b should be formed on both sides of area 7a with its gentle face leading to the surface of intermediate plate 4.

Furthermore, the setting form of the above-mentioned depression 7 formed by coining and, in particular, the width of area 7a having a constant depth as well as the shape of the curved surface of area 7b having a gentle face can be regulated, by measuring the compressing force of the above-mentioned beads 2a and 3a by means of pressure sensitive paper, so that the force is equalized.

Figure 5:
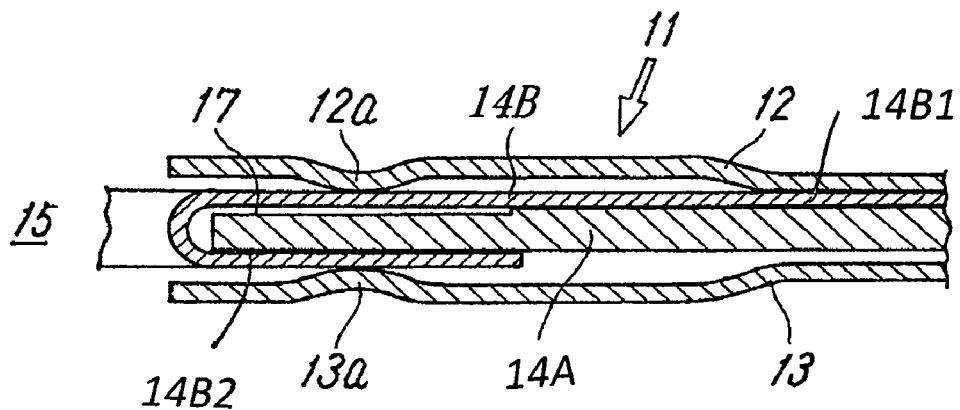
FIG. 5 is an enlarged partial cross sectional view at the same position as FIG. 2 in a second embodiment of the metal laminate gasket of the present invention.
Figure 6:
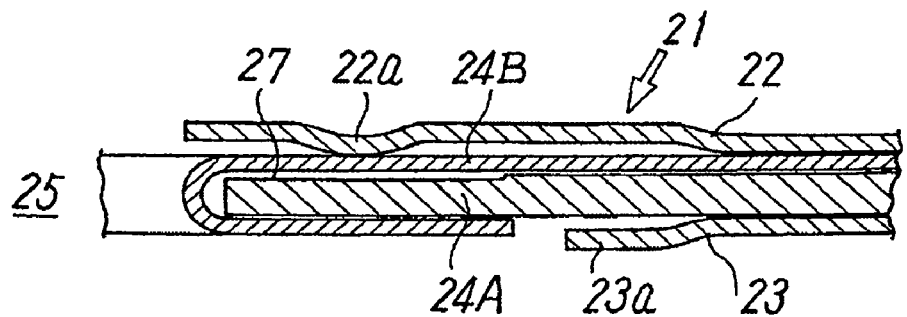
FIG. 6 is an enlarged partial cross sectional view at the same position as FIG. 2 in a third embodiment of the metal laminate gasket of the present invention.

FIGS. 5 and 6 illustrate cross sectional views in second and third embodiments of the present invention at the position corresponding to position 2-2 in FIG. 1.

Metal laminate gasket 11 in the second embodiment of the present invention shown in FIG. 5 has, as laminated multiple metal plates, outer plates 12 and 13, as well as two intermediate plates 14A and 14B interposed between these outer plates 12 and 13.

These outer plates 12 and 13 as well as intermediate plates 14A and 14B have communicating hole 15 corresponding to holes 8a and 9a (see FIG. 2) of the above-mentioned two members 8 and 9 coupled to each other via gasket 11. Bolt holes are to be provided around this communicating hole 15 as a matter of course but they are omitted in the figure.

In the above-mentioned metal laminate gasket 11, outer plates 12 and 13 among the above-mentioned laminated metal plates, serving as bead plates, form beads (full beads) 12a and 13a on the edge of communicating hole 15. With regard to the other laminated metal plates, namely two intermediate plates 14A and 14B, the thinner intermediate plate 14B is folded back in such a way that it covers the edge of communicating hole 15 at the thicker intermediate plate 14A, and depression 17 which is substantially the same as depression 7 in the first embodiment previously described in FIGS. 1 to 3 is formed by coining on intermediate plate 14A in the part covered by intermediate plate 14B. Thus, the intermediate plate 14B has a base portion 14B1 and a flange 14B2.

The description of the structure of this depression 17, including the range of its setting and its effects, is omitted here to avoid duplication since they are the same as in the case of the first embodiment.

Metal laminate gasket 21 in the third embodiment of the present invention shown in FIG. 6 has, as laminated multiple metal plates, outer plates 22 and 23, as well as two intermediate plates 24A and 24B situated between these outer plates 22 and 23. These outer plates 22 and 23 as well as intermediate plates 24A and 24B have communicating hole 25 corresponding to holes 8a and 9a (see FIG. 2) of the above-mentioned two members 8 and 9 coupled to each other via gasket 21. Bolt holes are to be provided around this communicating hole 25 as a matter of course but they are omitted in the figure.

In the above-mentioned metal laminate gasket 21, with regard to the two intermediate plates 24A and 24B among the above-mentioned laminated metal plates, the thinner intermediate plate 24B is folded back, as in the case of the second embodiment, in such a way that it covers the edge of communicating hole 25 at the thicker intermediate plate 24A. The other laminated metal plates, namely outer plates 22 and 23, serve as bead plates, wherein outer plate 22 forms bead (full bead) 22a, as in the case of the second embodiment, on the edge of communicating hole 25, and outer plate 23 is laminated on intermediate plate 24A within a limit not reaching the edge of the folded-back part of intermediate plate 24B and forms bead (half bead) 23a at its end.

As in the case of the second embodiment, depression 27 is formed by coining on intermediate plate 24A in the part covered by thinner intermediate plate 24B. The description of the structure of this depression 27, including the range of its setting and its effects, is omitted here since they are the same as in the case of depression 7 in the first embodiment previously described in FIGS. 1 to 3.

Figure 7:
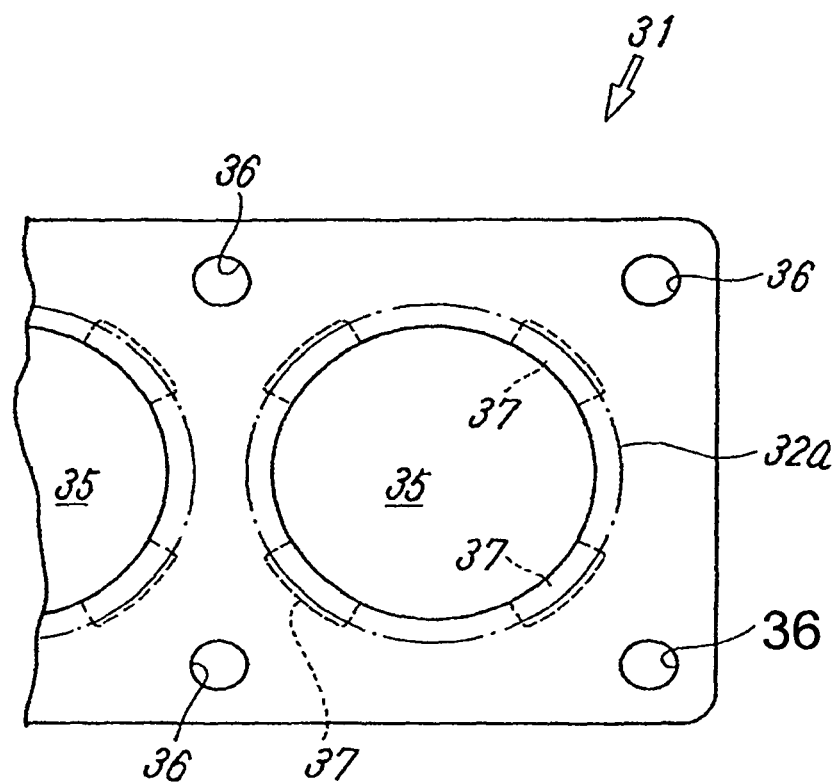
FIG. 7 is a partial top view showing a fourth embodiment in which the metal laminate gasket of the present invention is applied to a cylinder head gasket.

FIG. 7 illustrates a fourth embodiment in which a metal laminate gasket of the present invention is applied to a cylinder head gasket.

In this fourth embodiment, the two members 8 and 9 coupled to each other shown in FIG. 2 are a cylinder block and a head block in an internal combustion engine, and metal laminate gasket 31 shown in the figure, interposed between them, is arranged as a cylinder head gasket.

As in the first to third embodiments mentioned above, this metal laminate gasket 31 is formed by laminating multiple metal plates, and is arranged so that the communicating hole 35 provided in these plates faces the combustion chamber hole of the internal combustion engine. Bolt holes 36 are arranged around communicating hole 35.

In the above-mentioned metal laminate gasket 31, part of the laminated metal plates, serving as a bead plate, forms bead 32a on the edge of communicating hole 35, and depressions 37 are formed, by coining, on the edge of communicating hole 35 of the other laminated metal plate. These are substantially the same as described in the first to third embodiments.

The above-mentioned depressions 37 are provided on both sides of the line connecting the center of the above-mentioned communicating hole 35 and the center of each of bolt holes 36 for the purpose of equalizing the compressing force of the above-mentioned bead 32a generated by the fastening force of bolts. As for this depression 37, the description of its structure including the range of its setting and its effects is omitted here since they are the same as in the case of the first embodiment.

The disclosure of Japanese Patent Application No. 2007-266721 filed on Oct. 12, 2007 is incorporated as a reference.

While the invention has been described with reference to the specific embodiments of the invention, the explanation is illustrative and the invention is limited only by the appended claims.

What is claimed is:

1. A metal laminate gasket to be arranged between two members, comprising:
   a first metal plate having a first hole to be sealed, a first bead around the first hole, and a plurality of second holes around the first bead as bolt holes, and
   a second metal plate laminated with the first metal plate, said second metal plate having a third hole and fourth holes corresponding to the first and second holes, respectively, and depressions formed at a side facing the first metal plate around the third hole, each of the depressions being formed on two sides of a line connecting a center of the third hole and a center of each of the fourth holes so that a compressing force of the bead when the gasket is compressed becomes substantially equal around the first hole.

2. A metal laminate gasket according to claim 1, wherein each of the depressions has a constant depth area in a range of 15 to 20 degrees respectively on both sides of the line connecting the center of the third hole and the center of the fourth hole, and gentle faces on two sides of the constant depth area leading to a surface of the second metal plate.

3. A metal laminate gasket according to claim 1, wherein two to six bolt holes are formed equally around the first and third holes.

4. A metal laminate gasket according to claim 2, further comprising a third metal plate laminated on a side opposite to the first metal plate relative to the second metal plate, said third metal plate having fifth and sixth holes corresponding to the first and second holes, respectively, and a second bead projecting toward the second metal plate.

5. A metal laminate gasket according to claim 4, wherein said first and second beads are half beads projecting toward the second metal plate and arranged symmetrically relative to the second metal plate.

6. A metal laminate gasket according to claim 4, further comprising a fourth metal plate having a base portion located on the second metal plate at a side of the first metal plate, and a flange turning at an edge of the third hole of the second metal plate and disposed at a side opposite to the base portion.

7. A metal laminate gasket according to claim 6, wherein said first metal plate further includes a half bead surrounding the first bead outside thereof, said first bead being a full bead projecting toward the fourth plate.

8. A metal laminate gasket according to claim 7, wherein said third metal plate further includes another half bead surrounding the second bead outside thereof, said second bead being a full bead projecting toward the second metal plate.

9. A metal laminate gasket according to claim 7, wherein said third metal plate has a size not to laminate the flange of the fourth metal plate.

* * * * *